Patented Dec. 6, 1932

1,890,099

UNITED STATES PATENT OFFICE

WILLIAM SMITH AND JOHN THOMAS, OF GRANGEMOUTH, SCOTLAND, ASSIGNORS TO SCOTTISH DYES, LIMITED, OF GRANGEMOUTH, SCOTLAND

PRODUCTION OF DYESTUFF INTERMEDIATES OF THE ANTHRAQUINONE SERIES

No Drawing. Application filed April 10, 1928, Serial No. 269,021, and in Great Britain April 19, 1927.

This invention relates to the production of dyestuff intermediates particularly to a novel process for the preparation of 2-amino-3-chlor-anthraquinone.

We have discovered other methods of preparing this important intermediate and have found that if 2-amino-anthraquinone is chlorinated to the dichlor stage, this product which consists apparently of the 1.3-dichlor-2-amino-anthraquinone can be partially dehalogenated, for example, with alkaline hydrosulphite, at an elevated temperature, and in this way the alpha chlorine atom is eliminated and by oxidizing the leuco body formed 2-amino-3-chlor-anthraquinone can be obtained which can be purified by known methods such as recrystallization from organic solvent or by precipitation from sulphuric acid.

We have also discovered that processes such as indicated above applied to the formation of 2-amino-3-chlor-anthraquinone by partial dehalogenation of 1.3-dichlor-2-amino-anthraquinone and removal of the chlorine in the 1- or alpha-position can also be applied to the preparation of other amino-anthraquinone bodies by removal of the halogen from the alpha-position, for instance 1-amino-2-brom-anthraquinone from 1-amino-2:4-dibrom-anthraquinone, 1-amino-2-chlor-anthraquinone from 1-amino-2:4-dichlor-anthraquinone, 1-amino-2-chlor-anthraquinone from 1-amino-2-chlor-4-brom-anthraquinone, 1-amino-2-methyl-anthraquinone from 1-amino-2-methyl-4-brom-anthraquinone, 2:6-diamino-anthraquinone from 2:6-diamino-1:5-dichlor-anthraquinone. The invention consists in a process for the formation of amino anthraquinones which comprises treating halogenated amino anthraquinones having halogen in the alpha position in an alkaline medium with a reducing agent capable of producing a leuco body and subsequently oxidizing the leuco compound formed in the reaction.

The invention also consists in a process for the formation of amino-anthraquinones such as 2-amino-3-chlor-anthraquinone which comprises the treatment of halogenated-amino-anthraquinones having halogen in the alpha-position in suspension in presence of an alkaline agent selected from the following, namely:—

(a) Hydroxides of alkali metals,
(b) Hydroxides of alkaline earth metals, with a reducing agent selected from the following, namely:—

(I) Zinc and aluminum in the metallic state.
(II) Hydrosulphites, for example potassium and sodium hydrosulphites.
(III) Reducing sugars, for example lactose.

The invention also consists in processes for the preparation of amino anthraquinones particularly 2-amino-3-chlor-anthraquinone, substantially as hereinafter described.

The following examples illustrate how the invention may be carried into effect, all parts being parts by weight:—

Example 1

This describes the preparation of crude 1.3-dichlor-2-amino-anthraquinone from 2-amino-anthraquinone.

40 parts of 2-amino-anthraquinone are suspended in 400 parts of nitrobenzene and chlorine is passed into the mixture which is well stirred until the necessary increase in weight is obtained for the formation of dichlor-2-amino-anthraquinone hydrochloride. The mixture is then boiled for 1 hour, and after allowing to stand for several hours at ordinary temperature the product is filtered off. The hydrochloride so obtained is hydrolyzed with water.

Melting point of the crude product 215–218° C. It is brownish yellow in color.

Example 2

This describes the partial dehalogenation of 1.3-dichlor-2-amino-anthraquinone by means of hydrosulphite.

2 parts of dichlor-2-amino-anthraquinone are suspended in 50 parts of water. 2 parts of caustic soda and 2 parts sodium hydrosulphite are added and the mixture is stirred and boiled for an hour. Air is then passed through the mixture and when no more intermediate is being precipitated, the product is filtered off.

Example 3

This describes the purification of crude 2-amino-3-chlor-anthraquinone obtained by the process described in Example 2.

10 parts of crude 2-amino-3-chlor-anthraquinone are dissolved in 100 parts of concentrated sulphuric acid, and sufficient water to reduce the strength of the acid to 80 per cent. is then added slowly to the solution which is well stirred. The sulphate of 2-amino-3-chlor-anthraquinone which separates out is filtered, washed with 80 per cent. acid and then boiled with water to hydrolyze the sulphate.

The purified product melts about 310° C.

It can be brominated to give 1-brom-2-amino-3-chlor-anthraquinone which is a valuable starting point for synthesizing dyestuffs.

Example 4

This deals with 1.3-dichlor-2-amino-anthraquinone and the employment of alkaline glucose as a reducing agent.

10 parts of 1.3-dichlor-2-amino-anthraquinone are suspended in a solution of 70 parts of caustic potash in 90 parts of water and 5 parts of glucose are then added. The mixture is stirred for one hour at 125–130° C. and air is then passed into the warm mixture until no more of the new intermediate is precipitated. The product is filtered off and washed till free from alkali. It consists substantially of 2-amino-3-chlor-anthraquinone which may be further purified as described in Example 3.

Example 5

This deals with the use as a starting material of 1-chlor-2-amino-anthraquinone.

10 parts of 1-chlor-2-amino-anthraquinone are suspended in a solution of 70 parts of potassium hydroxide in 90 parts of water and 5 parts of glucose are added. The mixture is stirred at 125–130° C. for about half an hour and is then diluted with water and air is passed in till the new intermediate is completely precipitated. The product is filtered off, washed free from alkali and consists substantially of 2-amino-anthraquinone.

Example 6

This example deals with the use of an alkaline earth.

10 parts of 1-brom-2-amino-3-chlor-anthraquinone are mixed with 400 parts of water and 10 parts of calcium oxide. The mixture is stirred whilst being maintained at a temperature at about 60 to 70° C. and 2 parts of sodium hydrosulphite added. Stirring is continued and 10 further parts of sodium hydrosulphite are sprinkled in over a period of about 1½ hours. Air is then blown through the mixture until oxidation is complete after which the product is filtered. The filtrate is washed to free it of alkali and dried.

It consists substantially of 2-amino-3-chlor-anthraquinone.

Example 7

According to this example sodium hydroxide is used with 1-brom-2-amino-3-chlor-anthraquinone.

10 parts of 1-bromo-2-amino-3-chloro-anthraquinone are stirred into a solution of 12 parts of caustic soda in about 68 parts of water. The mixture is heated to boiling point and 7 parts of finely divided zinc dust sprinkled in over a period of 1½ hours. Oxidation is then effected by air blowing, the mixture acidified with hydrochloric acid, filtered and the residue washed to free it of acid after which it is dried.

The product consists substantially of 2-amino-3-chlor-anthraquinone.

Example 8

10 parts of 1-amino-2:4-dichlor-anthraquinone, 10 parts of sodium hydrosulphite, 10 parts of caustic soda and 250 parts of water are mixed together in the cold. The temperature is raised during about 1 hour to 65° C. and is kept at 65° C. for 2 hours. Air is then blown through until all the anthraquinone derivative is precipitated. It is filtered off, washed and dried and consists substantially of 1-amino-2-chlor-anthraquinone.

Example 9

13.2 parts of slaked lime, 10 parts of 1-amino-2:4-dibrom-anthraquinone and 150 parts of water are heated together to 50° C. At this temperature 6 parts of sodium hydrosulphite are added for a period of 1½ hours. Air is then blown through the mixture and the precipitate, which consists substantially of 1-amino-2-brom-anthraquinone, filtered off, washed and dried.

General

In place of zinc, aluminium may be employed and in place of glucose other reducing sugars may be used.

Having now described our invention, what we claim as new and desire to secure by Letters Patent is:—

1. The process which consists in treating halogenated amino-anthraquinones having halogen in the α position in suspension in the presence of an alkali chosen from the group consisting of hydroxides of alkali metals and hydroxides of alkaline earth metals with a reducing sugar.

2. A process for the formation of amino-anthraquinones which comprises treating halogenated amino-anthraquinones having halogen in the alpha position in an alkaline medium with an alkali-metal hydrosulphite, and subsequently oxidizing the leuco compound formed in the reaction.

3. The process which consists in treating halogenated amino-anthraquinones having halogen in the α position in suspension in the presence of an alkali chosen from the group consisting of hydroxides of alkali metals and hydroxides of alkaline earth metals with a reducing agent chosen from the group consisting of zinc and aluminium.

4. A process as claimed in claim 3 applied to the production of 2-amino-3-chlor anthraquinone.

5. The process which consists in treating halogenated amino-anthraquinones having halogen in the alpha position in suspension in the presence of an alkali metal hydroxide with a reducing agent chosen from the group consisting of zinc and aluminium.

6. The process which consists in treating halogenated amino-anthraquinones having halogen in the alpha position in suspension in the presence of an alkali chosen from the group consisting of hydroxides of alkali metals and of hydroxides of alkaline earth metals with a reducing agent chosen from the group consisting of zinc, aluminium, hydrosulphites and reducing sugars.

7. A process for the formation of amino-anthraquinones which comprises treating halogenated amino-anthraquinones having halogen in the alpha position in an alkaline medium with a reducing agent known to produce leuco anthraquinones, said reducing agent being chosen from the group consisting of zinc, aluminum, hydrosulphites and reducing sugars, and subsequently oxidizing the leuco compound formed in the reaction.

In testimony whereof we have signed our names to this specification.

WILLIAM SMITH.
JOHN THOMAS.